Oct. 20, 1970   J. F. GARREN, JR., ET AL   3,534,930
MECHANICAL STABILITY AUGMENTATION SYSTEM
Filed Feb. 24, 1969

INVENTORS
JOHN F. GARREN, JR.
JAMES R. KELLY
BY
William H. King
ATTORNEYS

United States Patent Office 3,534,930
Patented Oct. 20, 1970

3,534,930
MECHANICAL STABILITY AUGMENTATION SYSTEM
John F. Garren, Jr., Newport News, and James R. Kelly, Grafton, Va., assignors to the United States of America as represented by the Administrator of the National Aeronauticss and Space Administration
Filed Feb. 24, 1969, Ser. No. 801,336
Int. Cl. B64c 13/18
U.S. Cl. 244—76    5 Claims

ABSTRACT OF THE DISCLOSURE

This disclosure describes a mechanical stability augmentation system suitable for use with vertical take-off and landing aircraft. The system includes mechanical means for modifying a pilot's control signal to obtain a "model" or desired rate signal. The desired rate signal is compared with the actual rate signal and an error signal is generated. The error signal is compared with a modified lead signal and used to control a surface actuator.

The invention described herein was made by employees of the United States Government and may be manufactured and used by or for the Government for governmental purposes without the payment of any royalties thereon or thereafter.

BACKGROUND OF THE INVENTION

The handling characteristics exhibited by the first generation of vertical take-off and landing (VTOL) aircraft and by many, if not all, of the subsequent prototype aircraft have demonstrated a need for artificial stabilization under all but the most ideal operating conditions. Artificial stabilization is often necessary to make VTOL aircraft controllable rather than just to optimize characteristics which are, perhaps, already acceptable. Under such conditions, failure of the stabilization system can be catastrophic; hence, the reliability of the stabilization system must approach unity. This reliability requirement invites the use of a mechanical stabilization system, because mechanical systems are inherently more reliable than their non-redundant electronic counterparts.

Various mechanical stabilizing systems have been developed and are being used by the aircraft industry, mostly in helicopters. For example, a mechanical gyro has been developed for use in one type of helicopter. The gyro is mechanically powered by a direct drive from the helicopter power train and provides damping augmentation by using its precessional displacement as a direct input to the control system. A similar concept is employed in the gyro-bar used on another type of helicopter. While these sytsems can be designed to provide a desirably high degree of damping in opposition to external disturbances, the same high level of damping is present in opposition to the pilot's control input. Hence, unless corresponding high control power is available, maneuverability is sacrificed. Even if the maneuverability limitation is overcome by bleeding out the gyro input as a function of time, for example, these systems are capable of altering only the damping of the aircraft and do nothing about other unpleasant characteristics which may be present in the aircraft, such as high static stability or coupling, for example. Consequently, these prior art systems are not entirely satisfactory.

There has been at least one prior art attempt to improve the handling qualities of VTOL aircraft by mechanical means. It is somewhat of a misnomer to refer to this prior art system as a stabilization system, since it offers no resistance whatsoever to disturbances. The so-called stabilization is accomplished by preshaping the pilot's control input through a series of springs and dampers to achieve a desired response to a particular control input. Since the shaping is entirely open loop (i.e., no feedback of the aircraft's motion is employed), the aircraft's characteristics must be fairly well known and may not be subject to wide variations. Thus, aside from the fact that the system does not oppose disturbances, there is the problem of drift due to unknown or unaccounted for characteristics of a particular aircraft.

Therefore, it is an object of this invention to provide a stabilization system suitable for use with VTOL aircraft.

It is a further object of this invention to provide a mechanical stabilization system suitable for use with VTOL aircraft that has a high level of damping for external disturbances and a low level of damping for pilot maneuver control signals.

It is a still further object of this invention to provide a new and improved mechanical stabilization system suitable for use with VTOL aircraft that has mechanical system reliability, eliminates complex responses, has a high level of damping of external disturbances and has a low level of damping for pilot maneuver control signals.

SUMMARY OF THE INVENTION

In accordance with a principle of this invention, a mechanical stability augmentation system suitable for use on a VTOL aircraft is provided. The system includes means for sensing a pilot control maneuver signal about one axis of the VTOL aircraft and modifying the signal to obtain a "model" or desired rate signal. The model rate signal is compared with a rate signal derived from a suitable sensor located about the same axis of the VTOL aircraft. An error signal is generated as a result of the comparison. The error signal is compared with a lead modified signal derived from the pilot maneuver control signal and the signal resulting from this comparison is used to control a surface actuator. The surface controls movement of the VTOL aircraft about the same axis.

In accordance with a further principle of this invention, three systems of the type described in the preceding paragraph are utilized to control movement of the VTOL aircraft about the three principal axes of the aircraft.

In accordance with a still further principle of the invention, the pilot's maneuver control signal is modified by a suitable spring and damper subsystem to cause the generation of the desired model signal. In addition, mechanical summers are utilized to perform the various summations necessary to the operation to the system. And, the various interconnections are performed by mechanical interconnecting bars. Finally, the axis rate sensor is a rate gyro.

In accordance with a still further principle of the invention, the lead signal is derived by comparing a signal derived from the model rate and sensed rate summation, and a signal derived from the pilot's maneuver control signal.

It will be appreciated from the foregoing description that the invention provides an uncomplicated mechanical apparatus for augmenting the stability of a VTOL aircraft. Because the invention is formed of mechanical components, it is more reliable than systems formed of non-redundant electronic components. The mechanical stability augmentation system of the invention has the additional advantage that it provides a high level of damping of external disturbances because it uses a rate gyro for sensing disturbances about a particular axis. However, the system does not provide a high level of damping to pilot manuever control signals, because the pilot maneuver control signals are modifed prior to their application to a particular surface actuator. Complex pilot maneuver control signals are unnecessary due to the modification of a particular maneuver control signal prior to its being utilized to control surface actuator. It will also be appreciated that the invention provides constant response characteristics throughout transition and maneuvering, thereby simplifying a pilot's task and reducing the pilot training necessary to the operation of the VTOL aircraft.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
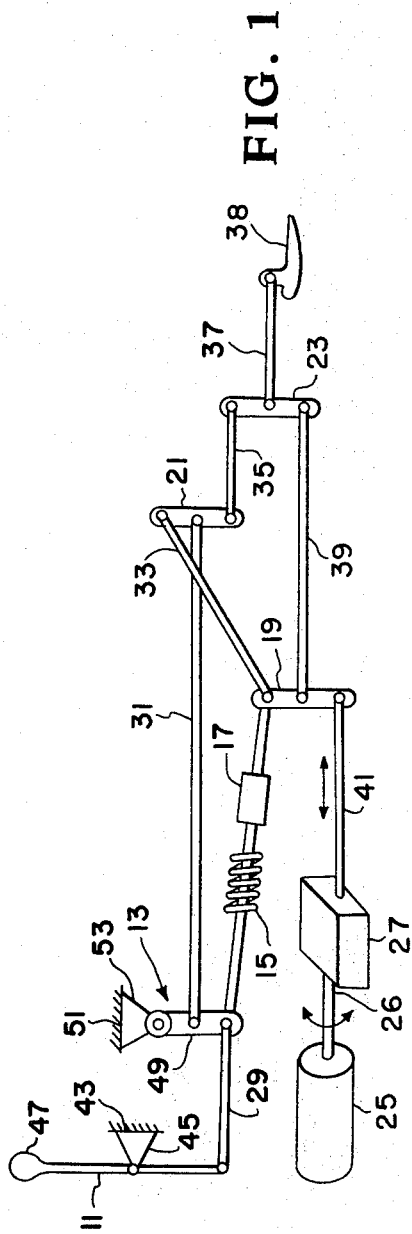
FIG. 1 is a pictorial view of a preferred embodiment of the apparatus of the invention.

FIG. 1 illustrates a preferred embodiment of the invention for controlling the movement of a VTOL aircraft about one axis. Each axis (pitch, roll, and yaw) uses an identical, independent system. The embodiment illustrated in FIG. 1 comprises: an aircraft control stick 11; a bellcrank 13; a spring 15; a damper 17; three mechanical summers 19, 21, and 23; a rate gyro 25; a gyro coupler 27; and seven connecting rods 29, 31, 33, 35, 37, 39, and 41.

The pilot's control stick 11 is connected to a fixed point 43 via a pivot block 45 attached to the stock pivotally at some point intermediate its length. The point of connection, of course, depends upon the specific aircraft utilizing the invention. Attached to one end of the control stick 11 is a pilot handle 47. It will be appreciated that the control stick 11 is a general representation of a pilot control means and other pilot control means suitably mounted in a VTOL aircraft and suitably interconnected can also be used.

The other end of the control stick 11 is connected via a first connecting rod 29 to one end of the bellcrank 13. The bellcrank 13 comprises a crank or lever arm 49 having upper, lower and center connecting points, as viewed in FIG. 1. The lower connecting point is (as previously stated) connected to the first connecting rod 29. The upper connecting point is connected to a fixed point 51 on the aircraft via a pivot block 53.

For ease of description, each mechanical summer is illustrated as a vertical bar having pivotal upper, lower and center connecting points; however, any type of mechanical summer suitable for performing the desired summing function may be used in the invention. The center connecting point of the lever arm 49 is pivotally connected via the second connecting rod 31 to the center connection of the second mechanical summer 21.

The lower connecting point of the lever arm 49 of the bellcrank 13 is also connected through the spring and damper 15 and 17 connected in series to the upper connecting point of the first mechanical summer 19. The upper connecting point of the first mechanical summer 19 is also connected via the third connecting rod 33 to the upper connecting point of the second mechanical summer 21. The spring may be a conventional coil spring and the damper may be a hydraulic damper, for example.

The shaft 26 of the rate gyro 25 is connected to the gyro coupler 27. The gyro coupler 27 converts the rotary motion of the shaft of the rate gyro into linear motion. The gyro coupler is connected to the lower connecting point of the first mechanical summer 19 via the seventh connecting rod 41. The center connecting point of the first mechanical summer 19 is connected via the sixth connecting rod 39 to the lower connecting point of the third mechanical summer 23. The upper connecting point of the third mechanical summer 23 is connected via the fourth connecting rod 35 to the lower connecting point of the second mechanical summer 21. The center connecting point of the third mechanical summer 23 is connected via the fifth connecting rod 37 to the surface actuator 38 of the VTOL aircraft.

In operation, when the pilot moves the control stick 11 to perform a particular control maneuver, the first connecting rod 29 moves the lever arm 49 of the bellcrank 13. This movement causes movement of the second connecting rod 31 and thereby applies a "lead" signal to the second mechanical summer 21. Movement of the lever arm 49 also applies a signal to the spring 15 and the damper 17. The spring and damper modify the maneuver control signal to provide a "model" or desired rate signal to the first mechanical summer 19. In essence, the spring 15 and the damper 17, form an integrator which integrates the control signal so as to create a model rate signal. The first mechanical summer 19 also receives a rate signal from the rate gyro via the coupler 27. The first mechanical summer 19 sums these two rate signals and applies a "lead-washout" signal via the third connecting rod 33 to the second mechanical summer 21 and an error signal to the third mechanical summer 23 via the sixth connecting rod 39. The second mechanical summer 21 compares the lead washout signal with the lead signal and applies a lead control signal, via the fourth connecting rod 35, to the third mechanical summer 23. The third mechanical summer 23 combines the error signal with the lead control signal and applies a control signal via the fifth connecting rod 37 to the surface actuator 38.

It will be appreciated from the foregoing description of the operation of the invention that the invention modifies a pilot manuever control signal so as to generate a model rate signal, the model rate signal being the rate signal that would occur for the ideal or perfect aircraft. The model signal is modified or combined with a rate signal so as to generate an error signal. The error signal is in turn modified by or combined with a lead control signal. The lead control signal prevents undesirable rapid rate responses by the actuator.

If an external disturbance occurs without a pilot maneuver signal occuring, high damping occurs. High damping of external disturbances occurs because the rate gyro senses the disturbances and applies a generally unmodified disturbance signal through first and third mechanical summers to the actuator.

Figure 2:
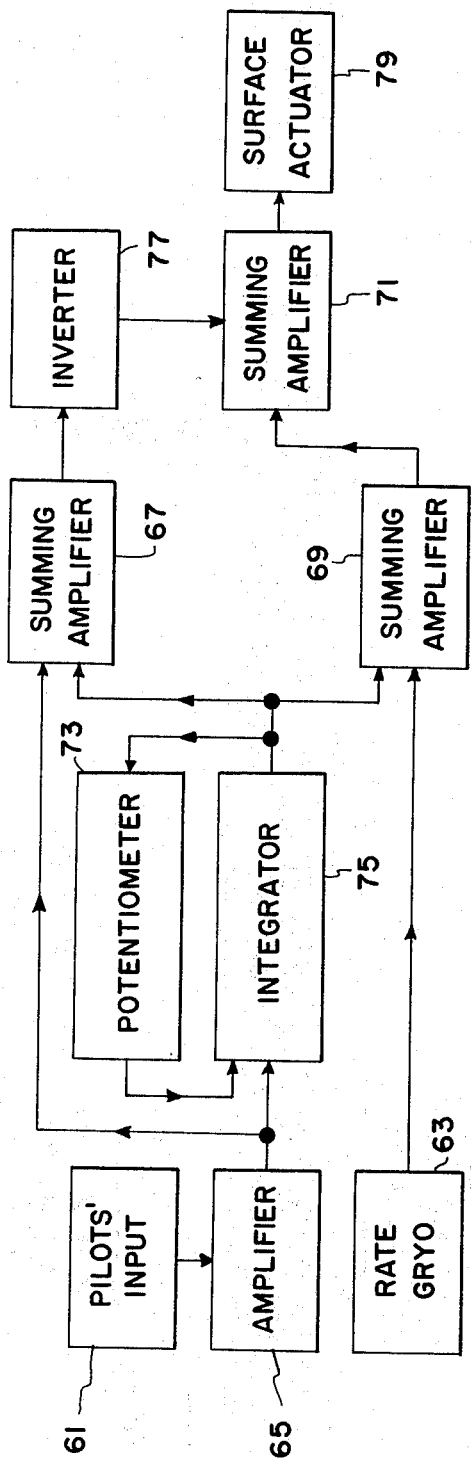
FIG. 2 is an electronic analog of the embodiment of the invention illustrated in FIG. 1.

To better understand the operation of the invention, an electrical analog of the invention is illustrated in FIG. 2. The electrical analog illustrated in FIG. 2 comprises: a pilot's input circuit 61; a rate gyro 63; an amplifier 65; first, second and third summing amplifiers 67, 69 and 71; a potentiometer 73; an integrator 75; an inverter 77; and a surface actuator 79. The output of the pilot's input circuit 61 is an electrical signal and is fed through the amplifier 65 to the signal input of the integrator 75 and to one input of first summing amplifier 67. The output of the rate gyro 63, which is also an electrical signal, is applied to one input of the second summing amplifier 69. The output of the integrator 75 is fed back through the potentiometer 73 to the control input of the integrator 75. The output of the integrator 75 is also connected to the second input of the first and second summing amplifiers 67 and 69, respectively. The output of the first summing amplifier 67 is connected through the inverter 77 to one input of the third summing amplifier 71. The output of the second summing amplifier 79 is connected to the second input of the third summing amplifier 71. The output of the third summing amplifier 71 is connected to the surface actuator 79 so as to control the operation of the surface actuator.

It will be appreciated by viewing FIG. 1 and FIG. 2 that there is a functional counterpart in the electrical analog for each element of the mechanical system. More specifically, the two outputs of the amplifier 65 represent the two outputs of the bellcrank 13, while the integrator 75 and potentiometer 73 represent the spring and damper 15 and 17. The first summing amplifier 67 represents the second mechanical summer 21, while the second summing amplifier 69 represents the first mechanical summer 19. The inverter 77 performs the same function as the reverse connection performed by the third connecting rod 33. That is, the third connecting rod 33, illustrated in FIG. 1, is connected to the upper connecting point of the second mechanical summer 21 rather than the lower connecting point; hence, its input is negative rather than positive with respect to the second mechanical summer 21. The third summing amplifier 71 is equivalent to the third mechanical summer 23 of FIG. 1.

Turning now more specifically to the operation of the electric analog illustrated in FIG. 2, the amplifier 65 has two outputs, one of which is an input to the model circuit represented by the integrator 75 and the potentiometer 73. The other signal serves as a lead signal and is applied to the first summing amplifier 67. The model circuit generates a simple first order response (i.e., an angular velocity response) to its input signal, with the potentiometer 73 controlling the gain of the circuit. The output of the model circuit is proportional to a desired angular rate and is applied to the first and second summing amplifiers 67 and 69. The second summing amplifier 69 compares the model rate with the actual rate which is sensed by the rate gyro 63. The difference between the two signals is an error signal and is applied to one input of the third summing amplifier 71. The other input to the third summing amplifier 71 is a preshaped lead control signal formed in the first summing amplifier 67. That is, the lead signal from the first amplifier 65 is modified by the model rate signal to provide a preshaped lead control signal. The output from the third summing amplifier 71 is the control signal and drives the surface actuator which may be an electro-hydraulic actuator, for example.

It will be appreciated from the foregoing description that the invention provides a mechanical stability augmentation system suitable for use with VTOL aircraft. Because it is mechanical, it can be easily inspected, utilizing standard inspection techniques developed by the aircraft industry. In addition, the invention has a high level of damping to external disturbances, while having a low level of damping for pilot maneuver control signals. In addition, complex responses are eliminated by reducing the mechanical coupling of the system to a minimum, reducing the effects of non-linearities and reducing the effects of static stability, and replacing them with a simple first order response which is easily controlled by a pilot. In addition, there are constant response characteristics throughout transition and maneuvering which simplify the pilot's task as well as reduce pilot training necessary to the operation of a VTOL aircraft.

What is claimed is:

1. A mechanical stability augmentation system for use on a VTOL aircraft comprising:
    sensing means for sensing movement about one axis of the three principal axes of the aircraft and for generating a rate signal in accordance with said movement;
    control means for sensing a pilot maneuver signal and for generating a maneuver control signal in accordance with said pilot maneuver signal;
    modifying means connected to said control means for receiving said maneuver control signal and for modifying said maneuver control signal in a predetermined manner;
    first summation means connected to said modifying means and said sensing means for summing the signals from said modifying means and said sensing means;
    second summation means connected to said first summation means and to said control means for summing the signals from said first summation means and said control means in a predetermined manner; and,
    third summation means connected to said first summation means and said second summation means in a predetermined manner to sum the signals generated by said first and second summation means and to apply said signal to an actuator to control movement along said one axis of the three principal axes of the aircraft.

2. A mechanical stability augmentation system for use on a VTOL aircraft as claimed in claim 1, wherein said modifying means comprises a spring and a damper connected in series.

3. A mechanical stability augmentation system for use on a VTOL aircraft as claimed in claim 2, wherein said sensing means comprises:
    a rate gyro having a shaft; and,
    a coupler connected to the shaft of said rate gyro, said coupler converting the rotary motion of said rate gyro into linear motion, said linear motion being applied to said first summation means.

4. A mechanical stability augmentation system for use on a VTOL aircraft as claimed in claim 3, wherein said control means comprises:
    a control stick pivotally mounted in said aircraft;
    a first connecting rod having one end connected to one end of said control stick; and,
    a bellcrank mounted in said aircraft, said bellcrank having outer end and a center connecting point, the outer end connecting point being connected to the other end of said first connecting rod and being connected through said spring and damper to said first summation means.

5. A mechanical stability augmentation system for use on an aircraft as claimed in claim 4 wherein:
    said first summation means comprises a mechanical summer having upper, lower and center connecting point, said upper connecting point being connected to said series connected damper spring;
    said second summation means comprises a mechanical summer having upper, lower and center connecting points;
    said third mechanical coupler comprises a mechanical summer having upper, lower and center connecting points; and, including:
    a second connecting rod connecting the center connecting point of said bellcrank to the center connecting point of said second mechanical summer;
    a third connecting rod connecting the upper connecting point of said first mechanical summer to the upper connecting point of said second mechanical summer;
    a fourth connecting rod connecting the lower connecting point of said second mechanical summer to the upper connecting point of said third mechanical summer;
    a fifth connecting rod adapted to connect the center connecting point of said third mechanical summer to said actuator;
    a sixth connecting rod connecting the center connecting point of said first mechanical summer to the lower connecting point of said third mechanical summer; and,
    a seventh connecting rod connecting said coupler to said lower connecting point of said first mechanical summer.

References Cited
UNITED STATES PATENTS 2,739,771   3/1956   Meredith           244—79
3,236,478   2/1966   Adams et al.      244—76

ANDREW H. FARRELL, Primary Examiner

U.S. Cl. X.R.

244—79